United States Patent
Oki et al.

(10) Patent No.: US 9,874,669 B2
(45) Date of Patent: Jan. 23, 2018

(54) REFLECTION FILM, OPTICAL MEMBER, AND DISPLAY

(71) Applicant: FUJIFILM CORPORATION, Tokyo (JP)

(72) Inventors: Kazuhiro Oki, Minami-ashigara (JP); Mitsuyoshi Ichihashi, Minami-ashigara (JP); Wataru Majima, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 14/742,296

(22) Filed: Jun. 17, 2015

(65) Prior Publication Data
US 2015/0369983 A1    Dec. 24, 2015

(30) Foreign Application Priority Data
Jun. 18, 2014    (JP) .................................. 2014-125651

(51) Int. Cl.
*G02F 1/1335* (2006.01)
*G02B 5/30* (2006.01)
(Continued)

(52) U.S. Cl.
CPC ......... *G02B 5/3016* (2013.01); *G02B 5/0841* (2013.01); *G02B 5/281* (2013.01)

(58) Field of Classification Search
CPC ..... G02B 5/3016; G02B 5/0841; G02B 5/281
(Continued)

(56) References Cited

U.S. PATENT DOCUMENTS

| | | | |
|---|---|---|---|
| 6,876,427 B2 * | 4/2005 | Bowley | C09K 19/02 252/299.01 |
| 7,652,736 B2 * | 1/2010 | Padiyath | B32B 17/10018 349/115 |

(Continued)

FOREIGN PATENT DOCUMENTS

| | | |
|---|---|---|
| JP | 2014-59437 A | 4/2014 |
| JP | 2014-98943 A | 5/2014 |

OTHER PUBLICATIONS

Japanese Notification of Reasons for Refusal for Japanese Application No. 2014-125651, dated Oct. 18, 2016, with a machine translation.

*Primary Examiner* — Charles Chang
(74) *Attorney, Agent, or Firm* — Birch, Stewart, Kolasch & Birch, LLP

(57) ABSTRACT

The present invention provides a reflection film, comprising a right circularly-polarized light reflection layer and a left circularly-polarized light reflection layer as circularly-polarized light reflection layers, each of the circularly-polarized light reflection layers consisting of a layer obtained by fixing a cholesteric liquid-crystalline phase, having a reflection wavelength at which a diffuse reflectance for non-polarized light becomes 50% or more in a wavelength region in which each of the circularly-polarized light reflection layers exhibits selective reflection, the reflection wavelength being in an infrared wavelength region, and the reflection film exhibiting a direct transmittance of non-polarized visible light of 50% or more and a haze value of 5% or less; and an optical member including the reflection film, which can be used as a handwriting input sheet. The optical member can be used by being stuck to the surface of a display.

19 Claims, 2 Drawing Sheets

(51) Int. Cl.
*G02B 5/08* (2006.01)
*G02B 5/28* (2006.01)

(58) Field of Classification Search
USPC .................................................. 349/96–98
See application file for complete search history.

(56) References Cited

U.S. PATENT DOCUMENTS

| | | | |
|---|---|---|---|
| 8,873,722 B2 | 10/2014 | Yoshida | |
| 2004/0164274 A1* | 8/2004 | Solomonson | C09K 19/52 252/299.7 |
| 2005/0200776 A1* | 9/2005 | Hara | G02B 5/3041 349/98 |
| 2006/0119783 A1* | 6/2006 | Fukuoka | G02B 5/3016 349/176 |
| 2006/0238867 A1* | 10/2006 | Takeda | G02B 27/288 359/485.02 |
| 2007/0109673 A1* | 5/2007 | Padiyath | B32B 17/10018 359/839 |
| 2010/0045924 A1* | 2/2010 | Powers | G02B 5/23 349/190 |
| 2010/0103337 A1* | 4/2010 | Takaku | C09K 19/36 349/33 |
| 2012/0206555 A1 | 8/2012 | Yoshida | |
| 2012/0263381 A1 | 10/2012 | Yoshida | |
| 2015/0192715 A1 | 7/2015 | Taguchi et al. | |

\* cited by examiner

REFLECTION FILM, OPTICAL MEMBER, AND DISPLAY

CROSS-REFERENCE TO RELATED APPLICATIONS

The present application claims priorities under 35 U.S.C § 119 to Japanese Patent Application No. 2014-125651 filed on Jun. 18, 2014, the entire content of which is incorporated by reference into the present application.

TECHNICAL FIELD

The present invention relates to a reflection film, an optical member and a display having an optical member.

BACKGROUND ART

In systems using an optical pen and a handwriting input sheet for digitizing handwritten information such as characters or figures and inputting these into an information processor, the handwriting input sheet usually include a layer in which information is written as an optical pattern and a reflection film for returning light emitted from an optical pen to an imaging element built in the optical pen as light reflecting the information described as the optical pattern. As an example, in Patent Literature 1, there is a description regarding an information input auxiliary sheet, in which an infrared reflecting layer having characteristics of reflecting infrared rays from one face side and allowing visible light to pass through is provided together with a dot pattern layer in which dots of a dot pattern defining repeatedly coordinate information and/or code information are arranged.

CITATION LIST

Patent Literature

[Patent Literature 1] Japanese Patent Laid-Open Publication No. 2014-098943

SUMMARY OF INVENTION

An object of the present invention is to provide a novel reflection film. In particular, an object of the present invention is to provide a reflection film capable of being used as a constituent member of a novel optical member that can be used as the above-described handwriting input sheet. Furthermore, another object of the present invention is to provide a novel optical member capable of being used as the above-described handwriting input sheet.

Solutions to the Problems

The present inventors have tried to solve the above-described problem through the utilization of a layer obtained by fixing cholesteric liquid-crystalline phase that is conventionally known to be capable of being used as a reflection member, and have repeatedly examined a preferable range as optical properties of a layer obtained by fixing a cholesteric liquid-crystalline phase when being used for the above-described application, thereby having completed the present invention.

Namely, the present invention provides following [1] to [19].

[1] A reflection film, including one or more circularly-polarized light reflection layers selected from the group consisting of a right circularly-polarized light reflection layer that selectively reflects right circularly-polarized light and a left circularly-polarized light reflection layer that selectively reflects left circularly-polarized light, the circularly-polarized light reflection layer consisting of a layer obtained by fixing a cholesteric liquid-crystalline phase, the reflection film having a reflection wavelength at which a diffuse reflectance for non-polarized light becomes 25% or more in a wavelength region in which the circularly-polarized light reflection layer exhibits selective reflection, the reflection wavelength being in an infrared wavelength region, and
the reflection film exhibiting a direct transmittance of non-polarized visible light of 50% or more and a haze value of 5% or less.

[2] The reflection film according to [1], wherein the circularly-polarized light reflection layer is a layer formed from a liquid crystal composition containing a polymerizable liquid crystal compound, a chiral agent and a horizontal alignment agent.

[3] The reflection film according to [2], wherein in-plane alignment azimuths of liquid crystal molecules on the outermost surface of the circularly-polarized light reflection layer are random.

[4] The reflection film according to any one of [1] to [3], having inclinations of helix axes of a cholesteric liquid-crystalline phase on at least one of outermost surfaces of the circularly-polarized light reflection layer, wherein the inclination of helix axes changes respectively in the plane, and the maximum value of the inclination of a helix axis is 20° or less.

[5] The reflection film according to any one of [1] to [4], including a right circularly-polarized light reflection layer that selectively reflects right circularly-polarized light and a left circularly-polarized light reflection layer that selectively reflects left circularly-polarized light as the circularly-polarized light reflection layers, the reflection wavelength being in a wavelength region in which both the right circularly-polarized light reflection layer and the left circularly-polarized light reflection layer exhibits selective reflection, and the diffuse reflectance being 50% or more.

[6] The reflection film according to [5], wherein a specular reflectance for non-polarized light is 20% or less at the reflection wavelength.

[7] The reflection film according to any one of [1] to [4], including either one circularly-polarized light reflection layer selected from the group consisting of a right circularly-polarized light reflection layer that selectively reflects right circularly-polarized light and a left circularly-polarized light reflection layer that selectively reflects left circularly-polarized light,
the reflection wavelength being in a wavelength region in which the circularly-polarized light reflection layer exhibits selective reflection, and
the reflection film selectively reflecting one of right circularly-polarized light and left circularly-polarized light for incident non-polarized light, at the reflection wavelength.

[8] The reflection film according to [7], wherein a specular reflectance for non-polarized light at the reflection wavelength is 15% or less.

[9] The reflection film according to any one of [1] to [8], including a transparent layer, wherein the transparent layer is directly in contact with at least one layer of the circularly-polarized light reflection layers.

[10] The reflection film according to [9], wherein the circularly-polarized light reflection layer is a layer formed from a liquid crystal composition containing a polymerizable liquid crystal compound, a chiral agent and a horizontal alignment agent, and at least one layer of the circularly-polarized light reflection layers is formed from the liquid crystal composition directly applied onto a surface of the transparent layer.

[11] The reflection film according to [9] or [10], wherein the transparent layer is a layer obtained by applying and curing a non-liquid crystalline composition containing a (meth)acrylate monomer.

[12] The reflection film according to any one of [9] to [11], including a base material, and including the base material, the transparent layer and the circularly-polarized light reflection layer in this order.

[13] An optical member including the reflection film according to any one of [1] to [12] and an information presentation layer, wherein the information presentation layer has a pattern of a material that absorbs or reflects light of the reflection wavelength.

[14] The optical member according to [13], including the circularly-polarized light reflection layer, the transparent layer and the information presentation layer in this order.

[15] The optical member according to [13], including the transparent layer, the circularly-polarized light reflection layer and the information presentation layer in this order.

[16] The optical member according to any one of [13] to [15], wherein the pattern is a dot pattern.

[17] The optical member according to any one of [13] to [16], wherein the pattern is provided by printing.

[18] The optical member according to [17], wherein the reflection film includes a base material, and the pattern is provided by printing on a surface of the base material.

[19] A display having the optical member according to any one of [13] to [19].

Effect of the Invention

According to the present invention, a novel reflection film and a novel optical member are provided. An optical member including the reflection film of the present invention can be applied as a handwriting input sheet or the like for use in systems using an optical pen for digitizing handwritten information and inputting the same into an information processor. The reflection film of the present invention has high visible light transmittance and low haze, and thus the handwriting input sheet using an optical member including the reflection film of the present invention can be used by being stuck to a display or by being integrated with a display.

BRIEF DESCRIPTION OF DRAWINGS

FIG. 1 (b) shows transmission spectrum of reflection film 2 prepared in Examples.

MODES OF CARRYING OUT INVENTION

Figure 1A:
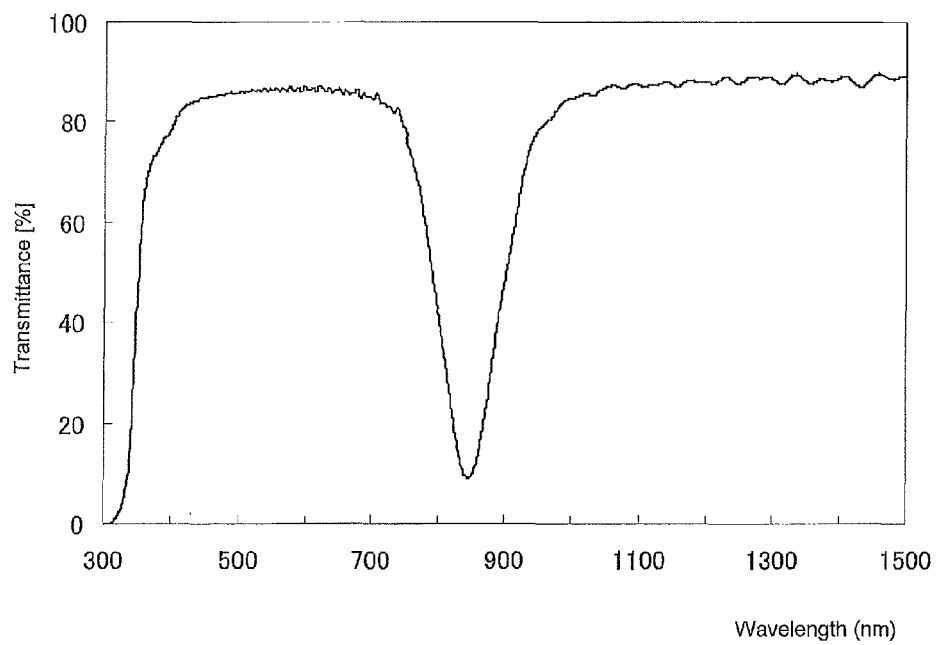
FIG. 1 (a) shows transmission spectrum of reflection film 1 prepared in Examples.

Hereinafter, the present invention will be explained in detail.

Note that, in the present description, "to" is used in the sense that numeric values described before and after the same are included as the lower limit and the upper limit.

In the present description, for example, angles such as "45°", "parallel", "perpendicular" or "orthogonal" mean, unless otherwise described in particular, that the difference from a strict angle is in a range of less than 5 degrees. The difference from a strict angle is preferably less than 4 degrees, more preferably less than 3 degrees.

In the present description, "(meth)acrylate" is used in the sense of "either one of or both of acrylate and methacrylate."

In the present description, when described as "selective" for circularly-polarized light, it means that the quantity of light of either a right circularly-polarized light component or a left circularly-polarized light component of irradiation light is larger than the other circularly-polarized light component. Specifically, when described as "selective," a degree of circularly-polarized light is preferably 0.3 or more preferably 0.6 or more, and further more preferably 0.8 or more. Substantial 1.0 is further preferable. Here, the degree of circularly-polarized light is a value represented by $|I_R-I_L|/(I_R+I_L)$, when denoting the intensity of a right circularly-polarized light component of light by $I_R$ and a left circularly-polarized light component of the light by $I_L$. For the purpose of representing the ratio of circularly-polarized light components of light, in the present description, the degree of circularly-polarized light may be used.

In the present description, "sense" used regarding circularly-polarized light means that the light is either right circularly-polarized light or left circularly-polarized light. The sense of circularly polarized light is defined such that, when light is seen as it proceeds toward an observer, the case where the tip of the electric field vector rotates clockwise with the increase in time is right-circularly polarized light and the case where the tip rotates counterclockwise is left-circularly polarized light.

In the present description, the term of "sense" may also be used regarding the helical twisting direction of a cholesteric liquid crystal. In the selective reflection by the cholesteric liquid crystal, when the helical twisting direction (sense) of the cholesteric liquid crystal is right-handed, right-circularly polarized light is reflected and left-circularly polarized light is transmitted, and when the sense is left-handed, left-circularly polarized light is reflected and right-circularly polarized light is transmitted.

Visible light is light of wavelengths that is visible by eyes of human among electromagnetic waves, and indicates light in the wavelength region of 380 nm to 780 nm. Infrared rays (infrared light) are electromagnetic waves in a wavelength region longer than visible light but is shorter than electric waves. Among infrared rays, near infrared light include electromagnetic waves in a wavelength region of 700 nm to 2500 nm.

In the present description, a "diffuse reflectance" or a "specular reflectance" is a value calculated on the basis of a value measured using a spectrophotometer and an integrating sphere unit. When the specular reflectance is based on a value measured using an integrating sphere unit, the specular reflectance may be a measurement value at an incident angle of, for example, 5° for convenience of measurement. The diffuse reflectance is a value that can be calculated by subtracting the specular reflectance from the total reflectance (measurement value in the total angle of an integrating sphere). The direct transmittance is a transmittance at 0° when the direct transmittance is based on a value measured using an integrating sphere unit.

In the present description, a "haze value" means a value measured using a haze meter NDH-2000 manufactured by NIPPON DENSHOKU INDUSTRIES, Co., LTD.

In theory, the haze value means a value represented by a formula below.

(Diffuse transmittance of 380 to 780 nm non-polarized light)/(diffuse transmittance of 380 to 780 nm non-polarized light+direct transmittance of non-polarized light)×100%

The diffuse transmittance is a value that can be calculated by subtracting a direct transmittance from an all-directional transmittance, which is obtained using a spectrophotometer and an integrating sphere unit.

In the present description, when simply "reflected light" or "transmitted light" is referred to, it is used in a meaning of including scattered light and diffracted light.

Note that the polarization state at respective wavelengths of light can be measured using a spectral radiance meter or a spectrometer mounted with a circular polarization plate. In this case, the intensity of light measured through a right-circular polarization plate corresponds to $I_R$, and the intensity of light measured through a left-circular polarization plate corresponds to $I_L$. Furthermore, ordinary light sources such as an incandescent light bulb, a mercury lamp, a fluorescent lamp and an LED emit approximate natural light, and properties of producing polarized light of a film being mounted on these can be measured using, for example, a polarized light retardation analysis apparatus "AxoScan" manufactured by Axometrics, Inc., and the like.

In addition, the properties can also be measured by attaching a reflection film to an illuminometer or a photo spectrometer. The quantity of right circularly-polarized light is measured by attaching a plate transmits right circularly-polarized light, the quantity of left circularly-polarized light is measured by attaching a plate transmits a left circularly-polarized light, with the result that the ratio can be measured.

<Reflection Film>

The reflection film is a film capable of reflecting infrared rays, and has, in the infrared wavelength region, a reflection wavelength at which the diffuse reflectance for non-polarized light is 25% or more. The wavelength of infrared rays that the reflection film reflects is not particularly limited. Preferably a reflection wavelength band having the central wavelength in a range of 750 to 2000 nm, more preferably in a range of 800 to 1500 nm may be observed in a transmittance spectrum of the reflection film. The reflection wavelength is also preferably selected according to the wavelength of a light source included in a reading device that is used by combination, or to the wavelength of an infrared ray that a sensor of an imaging element detects. The half-value width of the reflection wavelength band is preferably 50 to 500 nm, more preferably 100 to 300 nm.

The above-described reflection wavelength at which the diffuse reflectance becomes 25% or more may lie in a wavelength region in which a cholesteric liquid-crystalline layer to be described later exhibits selective reflection, and may correspond to the central wavelength of the selective reflection.

As described also in Japanese Patent Laid-Open Publication No. 2014-098943, paragraph 0391, there is a problem in which, when the reflection of a reflection film is specular reflection, namely, when the diffuse reflectance is low, the sensitivity of an imaging element that reads out a part of a pattern as information by utilizing the reflected light of the reflection film deteriorates. The optical member of the present invention can resolve the problem by using a reflection film having a diffuse reflectance of 25% or more.

The reflection film may be a film that selectively reflects either one of right circularly-polarized light and left circularly-polarized light, or may be a film that reflects both right circularly-polarized light and left circularly-polarized light, when non-polarized light of the reflection wavelength enters.

When the reflection film is a film that selectively reflects either one of right circularly-polarized light and left circularly-polarized light, the diffuse reflectance of the reflection film may be, furthermore, 30% or more, 35% or more or 40% or more, and may be 47% or less, 45% or less, 42% or less, or the like.

When the reflection film is a film that reflects both right circularly-polarized light and left circularly-polarized light, the diffuse reflectance of the reflection film is preferably 50% or more, and, furthermore, may be 60% or more, 70% or more or 80% or more, and may be 95% or less, 90% or less or 85% or less, or the like.

When the reflection film is a film that selectively reflects either one of right circularly-polarized light and left circularly-polarized light, the specular reflectance of the reflection film for non-polarized light at the above-described reflection wavelength is preferably 15% or less, more preferably 13% or less.

When the reflection film is a film that reflects both right circularly-polarized light and left circularly-polarized light, the specular reflectance of the reflection film for non-polarized light at the above-described reflection wavelength is preferably 20% or less, more preferably 15% or less, and further more preferably 10% or less.

The reflection film may be transparent in a visible light region. Concretely, the direct transmittance of non-polarized visible light at a wavelength in 380-780 nm is 50% or more. Furthermore, in particular, the haze value is 5% or less. The haze value is preferably 3% or less, more preferably 2% or less.

The reflection film of the present invention has a high diffuse reflectance for light in an infrared region and has a low haze value in a visible light region at the same time. Therefore, the reflection film can preferably applied to the case where the above-described handwriting input sheet used in combination with an optical pen that emits infrared rays is used by being stuck to, in particular, the surface of a display such as a television.

The reflection film includes one or more of circularly-polarized light reflection layers selected from the group consisting of the right circularly-polarized light reflection layer that selectively reflects right circularly-polarized light and the left circularly-polarized light reflection layer that selectively reflects left circularly-polarized light. With such a configuration that the reflection film includes both the right circularly-polarized light reflection layer and the left circularly-polarized light reflection layer and selective reflections of both overlaps each other, both right circularly-polarized light and left circularly-polarized light can be reflected at a specific wavelength. When either the right circularly-polarized light reflection layer or the left circularly-polarized light reflection layer is included in the reflection film, either one of right circularly-polarized light and left circularly-polarized light can be selectively reflected.

[Circularly-Polarized Light Reflection Layer: Layer Obtained by Fixing Cholesteric Liquid-Crystalline Phase]

In the reflection film of the present invention, the circularly-polarized light reflection layer includes a layer obtained by fixing a cholesteric liquid-crystalline phase. The cholesteric liquid-crystalline phase is known to have a circularly-polarized light selective reflection property of selectively reflecting either one of right circularly-polarized light and left circularly-polarized light. As films exhibiting the circularly-polarized light selective reflection property, many films formed from a composition containing a polymerizable liquid crystal compound are conventionally known, and these conventional technologies can be referred to regarding the layer obtained by fixing a cholesteric liquid-crystalline phase.

The layer obtained by fixing a cholesteric liquid-crystalline phase may be a layer in which the alignment of liquid crystal compounds in a cholesteric liquid-crystalline phase is maintained, and, typically, may be a layer obtained by putting a polymerizable liquid crystal compound into an alignment state of a cholesteric liquid-crystalline phase, then polymerizing and curing the same by ultraviolet ray irradiation or heating to thereby form a layer having no flowability, and at the same time, by changing the same into a state where the alignment form is not changed by an external field or an external force. Note that, in the layer obtained by fixing a cholesteric liquid-crystalline phase, it is sufficient that the optical properties of the cholesteric liquid-crystalline phase is maintained in the layer, and the liquid crystalline compound in the layer may not exhibit liquid crystallinity any more. For example, the polymerizable liquid crystal compound may have been made into a polymer by a curing reaction and have lost liquid crystallinity any more.

In the present description, the layer obtained by fixing cholesteric liquid-crystalline phase may be referred to as a cholesteric liquid-crystalline layer or a liquid crystalline layer.

The layer obtained by fixing a cholesteric liquid-crystalline phase shows circularly-polarized light selective reflection derived from a helical structure of the cholesteric liquid crystal. The central wavelength $\lambda$ of the selective reflection of circularly-polarized light depends on a pitch length P of the helical structure (=cycle of helix) in the cholesteric phase, and follows the relation of $\lambda=n\times P$, n being an average refractive index of the cholesteric liquid crystalline layer. Consequently, a wavelength that exhibits a selective reflection property of circularly-polarized light can be adjusted by adjustment of the pitch length of the helical structure. Namely, in order that the layer selectively reflect either one of right circularly-polarized light and left circularly-polarized light in at least a part of near infrared light wavelength region, the central wavelength $\lambda$, can be set to be in a wavelength region of 750 nm to 2000 nm, preferably 800 nm to 1500 nm by adjusting the n value and the P value. The pitch length of a cholesteric liquid-crystalline phase depends on the type and the addition amount of a chiral agent to be used with the polymerizable liquid crystal compound, and thus an intended pitch length can be obtained by adjusting the type and the addition amount of a chiral agent. Note that, as a method for measuring sense or pitch of helix, methods described in "Easy Steps in Liquid Crystal Chemistry Experiment" p 46, edited by the Japanese Liquid Crystal Society, Sigma Publishing, published in 2007, or "Liquid Crystal Handbook" p 196, Editorial Committee of Liquid Crystal Handbook, Maruzen can be used.

The sense of reflected circularly-polarized light of a cholesteric liquid-crystalline layer coincides with the sense of the helix. Consequently, cholesteric liquid-crystalline layers having the right-handed or left-handed sense of a helix may be used as a right circularly-polarized light reflection layer or a left circularly-polarized light reflection layer, respectively. The reflection film may include one cholesteric liquid-crystalline layer, or may include two or more layers. When the reflection film includes two or more layers, for example, plural cholesteric liquid-crystalline layers having the same cycle P and the same helical sense may be stacked to thereby form a right circularly-polarized light reflection layer or a left circularly-polarized light reflection layer, or plural cholesteric liquid-crystalline layers having different cycles P and the same helical sense may be stacked to thereby form a right circularly-polarized light reflection layer or a left circularly-polarized light reflection layer. In stacking a right circularly-polarized light reflection layer and a left circularly-polarized light reflection layer, or in stacking right circularly-polarized light reflection layers each other or left circularly-polarized light reflection layers each other, a separately produced cholesteric liquid-crystalline layer may be stacked using an adhesive and the like, or a liquid crystal composition containing a polymerizable liquid crystal compound or the like may be directly applied onto a surface of a cholesteric liquid-crystalline layer having been formed by a method to be described later, and alignment and fixing processes may be repeated.

Furthermore, as to the half-value width $\Delta\lambda$ (nm) of a selective reflection band (circularly-polarized light reflection band) that represents circularly-polarized light selective reflection, $\Delta\lambda$, depends on the birefringence $\Delta n$ and the pitch length P of a liquid crystal compound, and the relationship of $\Delta\lambda=\Delta n\times P$ holds. Consequently, the control of the width of a selective reflection band can be performed by adjusting $\Delta n$. The adjustment of $\Delta n$ can be performed by adjusting the type or mixing ratio of a polymerizable liquid crystal compound, or by controlling the temperature at the time of fixing the alignment.

Note that the reflection central wavelength and half-value width of a cholesteric liquid-crystalline layer can be obtained as follows.

When a transmission spectrum of a cholesteric liquid-crystalline layer is measured using a spectrophotometer UV3150 (by Shimadzu Corporation), a peak of transmittance reduction is observed in the selective reflection region. When denoting the value of the wavelength on the shorter wavelength side by $\lambda 1$ (nm) and the value of the wavelength on the longer wavelength side by $\lambda 2$ (nm), of two wavelengths that give ½ the largest peak height of the transmittance, the reflection central wavelength and the half-value width can be represented by formulae below.

Reflection central wavelength=$(\lambda 1+\lambda 2)/2$

Half-value width=$(\lambda 2-\lambda 1)$

The width of the circularly-polarized light reflection band (since the reflection spectrum profile of circularly-polarized light of a cholesteric liquid-crystalline layer is square, usually, the "width" is substantially the same as the "half-value width $\Delta\lambda$") is, usually, approximately 50 nm to 150 nm in the case of a liquid crystal compound of one type. In order to expand the selective wavelength region, two or more types of cholesteric liquid-crystalline layers having different cycles P and thereby giving different central wavelengths of reflected light may be stacked. Alternatively, the controlled wavelength region can also be expanded by gradually changing the cycle P in the thickness direction, in one cholesteric liquid-crystalline layer.

Hereinafter, production materials and a production method of the cholesteric liquid-crystalline layer will be explained.

Examples of materials to be used for forming the cholesteric liquid-crystalline layer include a liquid crystal composition containing a polymerizable liquid crystal compound, etc. The liquid crystal composition preferably contains a chiral agent and a horizontal alignment agent. The liquid crystal composition may further contain a surfactant and a polymerization initiator.

The cholesteric liquid-crystalline layer can be formed by applying the liquid crystal composition onto a base material, a transparent layer or a cholesteric liquid-crystalline layer serving as a lower layer, maturing cholesteric alignment, and after that, fixing the same.

(Polymerizable Liquid Crystal Compound)

The polymerizable liquid crystal compound may be a rod-like liquid crystal compound or a discotic liquid crystal compound, but a rod-like liquid crystal compound is preferable.

Examples of rod-like polymerizable liquid crystal compounds for forming a cholesteric liquid-crystalline layer include a rod-like nematic liquid crystal compound. As the rod-like nematic liquid crystal compound, azomethines, azoxys, cyanobiphenyls, cyanophenyl esters, benzoic esters, cyclohexane carboxylic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles are preferably used. Not only low-molecular-weight liquid crystal compounds, but also high-molecular-weight liquid crystal compounds can be used.

The polymerizable liquid crystal compound can be obtained by introducing a polymerizable group into a liquid crystal compound. Examples of the polymerizable groups include an unsaturated polymerizable group, an epoxy group and an aziridinyl group, and an unsaturated polymerizable group is preferable, and an ethylenically unsaturated polymerizable group is particularly preferable. The polymerizable group can be introduced into the molecule of a liquid crystal compound by various methods. The number of polymerizable groups of a polymerizable liquid crystal compound is preferably 1 to 6, more preferably 1 to 3. Examples of the polymerizable liquid crystal compounds include compounds described in Makromol. Chem., vol. 190, p 2255 (1989), Advanced Materials vol. 5, p 107 (1993), U.S. Pat. Nos. 4,683,327, 5,622,648 and 5,770,107, International Publication Nos. WO 95/22586, 95/24455, 97/00600, 98/23580 and 98/52905, Japanese Patent Laid-Open Publication Nos. 01-272551, 06-16616, 07-110469, 11-80081 and 2001-328973. Two or more types of polymerizable liquid crystal compounds may be simultaneously used. The simultaneous use of two or more types of polymerizable liquid crystal compounds can lower the alignment temperature.

Furthermore, the addition amount of the polymerizable liquid crystal compound in the liquid crystal composition is preferably 80 to 99.9% by mass relative to the solid mass (the mass obtained by removing a solvent) of the liquid crystal composition, more preferably 85 to 99.5% by mass, and particularly preferably 90 to 99% by mass.

(Chiral Agent: Optically Active Compound)

The chiral agent has a function of inducing the helical structure of the cholesteric liquid-crystalline phase. Since chiral compounds have different helical senses or helical pitches to be induced depending on compounds, the selection may be carried out in accordance with the purpose.

No particular limitation is imposed on the chiral agent, and known compounds (for example, those described in Liquid Crystal Device Handbook, Chapter 3, Section 4-3, Chiral agent for TN and STN, p 199, edited by Japan Society for the Promotion of Science, 142nd Committee, 1989), isosorbide and isomannide derivatives can be used.

The chiral agent generally contains an asymmetric carbon atom, but an axially asymmetric compound or a planarly asymmetric compound which does not contain an asymmetric carbon atom can also be used as the chiral agent. Examples of the axially asymmetric compounds or planarly asymmetric compounds include binaphthyl, helicene, paracyclophane, and derivatives thereof. The chiral agent may have a polymerizable group. When both the chiral agent and the liquid crystal compound have a polymerizable group, a polymer having a repeating unit induced from the polymerizable liquid crystal compound and a repeating unit induced from the chiral agent can be formed by a polymerization reaction between the polymerizable chiral agent and the polymerizable liquid crystal compound. In this aspect, the polymerizable group of the polymerizable chiral agent is preferably the same type of group as the polymerizable group of the polymerizable liquid crystal compound. Accordingly, the polymerizable group of the chiral agent is also preferably an unsaturated polymerizable group, an epoxy group or an aziridinyl group, more preferably an unsaturated polymerizable group, and particularly preferably an ethylenically unsaturated polymerizable group.

In addition, the chiral agent may be a liquid crystal compound.

When the chiral agent has a photoisomerization group, a pattern of an intended reflection wavelength corresponding to an emission wavelength can be preferably formed by photomask irradiation with an active ray or the like, after the application and alignment. As the photoisomerization group, an isomerization site of a compound exhibiting a photochromic property, an azo group, an azoxy group, and a cinnamoyl group are preferable. As a concrete compound, a compound described in Japanese Patent Laid-Open Publication Nos. 2002-80478, 2002-80851, 2002-179668, 2002-179669, 2002-179670, 2002-179681, 2002-179682, 2002-338575, 2002-338668, 2003-313189 or 2003-313292 can be used.

The content of the chiral agent in the liquid crystal composition is preferably 0.01% by mole to 200% by mole of the amount of the polymerizable liquid crystalline compound, more preferably 1% by mole to 30% by mole.

(Polymerization Initiator)

The liquid crystal composition preferably contains a polymerization initiator. In an aspect of proceeding with a polymerization reaction by ultraviolet ray irradiation, the polymerization initiator to be used is preferably a photo polymerization initiator that can initiate a polymerization reaction by the ultraviolet ray irradiation. Examples of the photo polymerization initiators include α-carbonyl compounds (described in U.S. Pat. No. 2,367,661 or 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. No. 3,046,127 or 2,951,758), a combination of triarylimidazol dimer and p-aminophenyl ketone (described in U.S. Pat. No. 3,549,367), acridine and phenazine compounds (described in Japanese Patent Laid-Open Publication Nos. 60-105667 or U.S. Pat. No. 4,239,850), oxadiazole compounds (described in U.S. Pat. No. 4,212,970), and the like.

The content of the photo polymerization initiator in the liquid crystal composition is preferably 0.1% by mass to 20% by mass, more preferably 0.5% by mass to 5% by mass, relative to the content of the polymerizable liquid crystal compound.

(Cross-Linking Agent)

The liquid crystal composition may arbitrarily contain a cross-linking agent for enhancing film strength and durability after curing. As the cross-linking agent, those that are curable by ultraviolet rays, heat, moisture or the like can suitably be used.

The cross-linking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis (ethyleneiminocarbonylamino)diphenylmethane; isocyanate compounds such as hexamethylene diisocyanate and biuret type isocyanate; polyoxazoline compounds having an oxazoline group on a side chain; alkoxysilane compounds such as vinyltrimethoxysilane and N-(2-aminoethyl)3-aminopropyltrimethoxysilane; and the like. Furthermore, a known catalyst can be used in accordance with the reactivity of the cross-linking agent, and thus productivity can be enhanced in addition to the enhancement of film strength and durability. These may be used in one type alone or in combination of two or more types thereof.

The content of the cross-linking agent is preferably 3% by mass to 20% by mass, more preferably 5% by mass to 15% by mass. When the content of the cross-linking agent is less than 3% by mass, the effect of enhancing cross-link density may not be obtained, and when the content exceeds 20% by mass, the stability of the cholesteric liquid-crystalline layer may be deteriorated.

(Horizontal Alignment Agent)

A horizontal alignment agent may be added to the liquid crystal composition, as an alignment control agent that contributes to achieving stably or quickly a cholesteric liquid-crystalline layer of planar alignment. Examples of the horizontal alignment agents include fluorine-containing (meth)acrylate-based polymers described in Japanese Patent Laid-Open Publication No. 2007-272185, paragraphs [0018]-[0043] or the like, and compounds represented by formulae (I)-(IV) described in Japanese Patent Laid-Open Publication No. 2012-203237, paragraphs [0031]-[0034] or the like.

Note that, as the horizontal alignment agent, one type may be used alone, or two or more types thereof may be simultaneously used.

The addition amount of the horizontal alignment agent in the liquid crystal composition is preferably 0.01% by mass to 10% by mass, more preferably 0.01% by mass to 5% by mass, and particularly preferably 0.02% by mass to 1% by mass, relative to the total mass of the polymerizable liquid crystal compound.

(Other Additives)

In addition, the liquid crystal composition may contain at least one type selected from various additives such as a surfactant for adjusting the surface tension and making the thickness of the applied film uniform, a polymerizable monomer, etc. Furthermore, a polymerization inhibitor, an oxidation inhibitor, an ultraviolet ray absorber, a light stabilizer, a colorant, a metal oxide fine particle or the like may be added, as necessary, to the liquid crystal composition in a range not lowering the optical properties.

(Application, Alignment, Curing)

The cholesteric liquid-crystalline layer in which the cholesteric regularity is fixed can be formed by applying, onto a base material, a liquid crystal composition obtained by dissolving the polymerizable liquid crystal compound and the polymerization initiator, and a chiral agent, surfactant or the like, which are added as necessary, by drying the same to thereby give a coating film, and by irradiating the coating film with actinic rays to thereby cure the cholesteric liquid crystalline composition. Note that a stacked film including a plurality of cholesteric liquid-crystalline layers can be formed by repeating the manufacture processes of the cholesteric liquid-crystalline layer.

The solvent used for preparing the liquid crystal composition is not particularly limited and can be appropriately selected in accordance with the purpose, and an organic solvent is used preferably.

The organic solvent is not particularly limited and can be selected in accordance with the purpose. Examples of the organic solvent include ketones, alkyl halides, amides, sulfoxides, heterocyclic compounds, hydrocarbons, esters, ethers, and the like. These may be used in one type alone, or in combination of two or more types thereof. Among these, ketones are particularly preferred in consideration of environmental loads.

The method for applying the liquid crystal composition onto a base material is not particularly limited and can be appropriately selected in accordance with the purpose. Examples of the methods include a wire bar coating method, a curtain coating method, an extrusion coating method, a direct gravure coating method, a reverse gravure coating method, a die coating method, a spin coating method, a dip coating method, a spray coating method, a slide coating method, and the like. The application can also be performed by transferring a liquid crystal composition separately applied onto a temporary support, to a base material. Liquid crystal molecules are aligned by heating the applied liquid crystal composition. The heating temperature is preferably 200° C. or less, more preferably 130° C. or less. An optical thin film, in which polymerizable liquid crystal compounds are in a twisted alignment state so as to have a helix axis in a direction substantially perpendicular to the film surface, can be obtained by the alignment treatment.

The aligned liquid crystal compound may be further polymerized. The polymerization may be either thermal polymerization or photo polymerization by light irradiation, but photo polymerization is preferable. Ultraviolet rays are preferably used for light irradiation. Irradiation energy is preferably 20 mJ/cm$^2$ to 50 J/cm$^2$, more preferably 100 mJ/cm$^2$ to 1,500 mJ/cm$^2$. In order to accelerate the photo polymerization reaction, the light irradiation may be performed under heating conditions or under a nitrogen atmosphere. The wavelength of irradiated ultraviolet ray is preferably 350 nm to 430 nm. As to a polymerization reaction ratio, the higher one is preferable from the viewpoint of stability, 70% or more is preferable, and 80% or more is more preferable.

The polymerization reaction ratio can be determined by measuring the consumed ratio of polymerizable functional groups through the use of an IR absorption spectrum The thickness of the individual cholesteric liquid-crystalline layer is not particularly limited as long as the thickness falls within a range in which the layer exhibits the above-described characteristics. The thickness is preferably in a range of 1.0 μm or more and 150 μm or less, more preferably in a range of 4.0 μm or more to 100 μm or less.

The total thickness of the cholesteric liquid-crystalline layers included in the reflection film is preferably in a range of 2.0 μm and more to 300 μm or less, more preferably in a range of 8.0 μm or more and 200 μm or less. A thickness of 2.0 μm or more can sufficiently secure the selective reflection based on the periodic structure. Furthermore, the thickness of 300 μm or less can sufficiently secure the transmittance of visible light.

(Adjustment of Diffuse Reflectance of Cholesteric Liquid-Crystalline Layer)

As the result of studies by the present inventors, it has become clear that a cholesteric liquid-crystalline layer having a high diffuse reflectance and a low haze value at a selected reflection wavelength (infrared wavelength region)

is obtained by making the tilt angle of liquid crystal molecules small and by making in-plane alignment azimuths of liquid crystal molecules random on at least one surface of the layer or preferably on both surfaces of the layer. Namely, a cholesteric liquid-crystalline layer, in which the diffuse reflectance at a selected reflection wavelength is 50% or more and a haze value for non-polarized visible light is 5% or less, can be formed by adjusting the above-described tilt angle and in-plane alignment azimuths. The alignment direction of liquid crystal and the tilt angle in the vicinity of the surface of the cholesteric liquid-crystalline layer may be checked by observing the vicinity of the film surface in the cross-section of the cholesteric liquid-crystalline layer through the image of a transmission electron microscope (TEM).

The configuration having the inclination of helix axis of the cholesteric liquid-crystalline phase on the outermost surface can be realized by adjusting the tilt angle and the in-plane alignment azimuth of liquid crystal molecules on the surface of the cholesteric liquid-crystalline layer as described above. Having the inclination of helix axis means that there is a position in a plane in which the inclination of the helix axis to be described later is 2° or more. It is considered that the helix axes of the cholesteric liquid-crystalline phase can be distributed with a slight undulation in the plane, by the configuration having the inclination of helix axis of the cholesteric liquid-crystalline phase on the outermost surface. Namely, the shift of helix axis from the normal direction of the layer can be generated. The shift of the helix axis brings about a layer having scattering properties. A plurality of alignment defects may exist inside the layer.

The inclination of helix axis on the outermost surface of the cholesteric liquid-crystalline layer can be obtained as follows.

Figure 2:
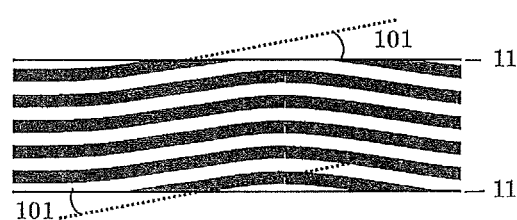
FIG. 2 is a schematic view of a stripe pattern of a bright part and a dark part, observed in a TEM observation of a cross-section of a cholesteric liquid-crystalline layer.

When performing TEM observation of a cholesteric liquid-crystalline layer cross-section, a stripe pattern of bright parts and dark parts can be observed. The stripe pattern is observed such that a bright part and a dark part are repeated in a direction approximately parallel to the layer surface. In FIG. 2, a schematic view is shown. Two repetitions of a bright part and a dark part (two bright parts and two dark parts) correspond to one pitch of helix. The normal line direction of the stripe pattern is the helix axis. The inclination of the helix axis on the outermost surface of the cholesteric liquid-crystalline layer can be obtained as an angle between the line formed by the first dark line from an outermost surface 11 and the outermost surface on the same side (101 in FIG. 2).

A layer of scattering properties having a high diffuse reflectance can be made by constituting the cholesteric liquid-crystalline layer such that the inclinations of the helix axis on the outermost surface vary in the plane. Note that "the inclination of the helix axis changes" means, for example, a state where, when the inclination of the helix axes is measured at constant intervals on an arbitrary straight line on the surface, increase and decrease are observed in the advancing direction of the straight line. The increase and decrease are preferably repeated, and the change is preferably continuous.

The outermost surface may be at least either one surface of the cholesteric liquid-crystalline layer (the uppermost surface or the lowermost surface), or both surfaces of the layer (the uppermost surface and the lowermost surface), but both surfaces of the layer are preferable.

Furthermore, the haze value (in visible wavelength region) can be adjusted to be as low as approximately 5% or less, by setting the maximum value of the inclination of the helix axis to be 20° or less. The maximum value of the inclination of the helix axis may be 2° or more and 20° or less, and is preferably 5° or more and 20° or less.

In the present description, the "tilt angle" means an angle formed between an inclined liquid crystal molecule and the layer plane, and means the largest angle among angles formed between the direction of the largest refractive index in the refractive index ellipsoid of a liquid crystal compound and the layer plane. Accordingly, in a rod-like liquid crystal compound having a positive optical anisotropy, the tilt angle means an angle formed between the long axis direction, namely, the director direction of the rod-like liquid crystal compound and the layer plane.

In-plane alignment azimuth of a liquid crystal molecule means an azimuth of the direction of the above largest refractive index of the liquid crystal molecule in a plane parallel to a layer. "The in-plane alignment azimuth is random" means a state where liquid crystal molecules having in-plane alignment azimuths different in 4° or more from the average azimuth of the in-plane alignment azimuth of liquid crystal compound molecules in the plane can be observed in a range of 10% or more and 20% or less, by using a TEM.

In the present description, the liquid crystal molecule means the molecule of the polymerizable liquid crystal compound in the liquid crystal composition, and when polymerizable liquid crystal compounds is made into a polymer by a curing reaction of the liquid crystal composition, the liquid crystal molecule means a partial structure corresponding to the mesogen group of the polymerizable liquid crystal compound molecule.

In the alignment of polymerizable liquid crystal compounds at the time of forming the cholesteric liquid-crystalline layer, the tilt angles of liquid crystal molecules on the surface on the lower side are preferably in a range of 0 degree to 20 degrees, more preferably 0 degree to 10 degrees. The density of alignment defect and the inclination angle distribution of helix axes can be set in a preferable range, by controlling the tilt angle to be the above-described values.

In the alignment of polymerizable liquid crystal compounds at the time of forming the cholesteric liquid-crystalline layer, preferably no alignment treatment such as rubbing is performed on the surface of another cholesteric liquid-crystalline layer, a base material, or a transparent layer to be described later onto which the liquid crystal composition is to be applied, in order to lower the tilt angle (pre-tilt angle) of liquid crystal molecules on the surface on the lower side as described above, preferably to make the alignment horizontal, and to reduce the alignment uniformity of liquid crystal molecules. In order to make liquid crystal molecules on the air interface side of the cholesteric liquid-crystalline layer horizontal, the use of the horizontal alignment agent is preferable.

[Transparent Layer]

The reflection film may include a transparent layer as a lower layer onto which the liquid crystal composition is applied in forming the cholesteric liquid-crystalline layer. A layer formed of a material that gives a low pre-tilt angle to polymerizable liquid crystal compound molecules in the liquid crystal composition provided on the surface of the transparent layer, can be preferably used as the transparent layer.

For example, a material obtained by applying and curing a non-liquid crystal polymerizable composition containing a (meth)acrylate monomer, gelatin, a urethane monomer and the like can be used as the transparent layer. For example, an acrylic layer obtained by applying and curing a layer containing a (meth)acrylate monomer is isotropic in the plane, and thus, when a liquid crystalline layer is formed without performing a rubbing treatment for the surface of the acrylic layer, the in-plane alignment azimuth of the liquid crystal in contact with the acrylic layer becomes random.

Consequently, the cholesteric liquid-crystalline layer formed by applying the liquid crystal composition onto the surface of the acrylic layer can be made into a layer having alignment defects.

Additionally, when a liquid crystalline layer is formed on the liquid crystalline layer having alignment defects, a liquid crystalline layer having alignment defects can be formed in the same manner.

Besides, resins such as polyimide (such as polyimide varnish SUNEVER130 manufactured by Nissan Chemical Industries, Ltd.), polyvinyl alcohol, polyester, polyarylate, polyamide-imide, polyether imide, polyamide and modified polyamide may be used as the transparent layer. In order to form a cholesteric liquid-crystalline layer having a high diffuse reflectance, preferably the surface of the transparent layer onto which the liquid crystal composition is to be applied is not subjected to a rubbing treatment (for example, a rubbing treatment by rubbing the surface of the polymer layer with paper, cloth or the like, in a fixed direction).

The thickness of the transparent layer is preferably 0.01 to 50 µm, more preferably 0.05 to 20 µm.

[Base Material]

The reflection film may include a base material as a support of the cholesteric liquid-crystalline layer. The base material may also function as the above-described transparent layer.

As to the layer configuration of the reflection film when the reflection film includes the base material and the transparent layer, the configuration may be such that the base material, the transparent layer and the circularly-polarized light reflection layer are arranged in this order. In a configuration in which two or more circularly-polarized light reflection layers are included, the configuration, in which all the circularly-polarized light reflection layers are adjacent with each other and both the base material and the transparent layer are not included between circularly-polarized light reflection layers, is preferable.

The base material is not particularly limited. A plastic film can be used as the base material. Examples of the plastic films include polyesters such as polyethylene terephthalate (PET), polycarbonate, acrylic resin, epoxy resin, polyurethane, polyamide, polyolefin, cellulose derivatives, silicone and the like.

The thickness of the base material may be approximately 5 µm to 1000 µm, and is preferably 10 µm to 250 µm, more preferably 15 µm to 90 µm.

Note that the support used for forming a cholesteric liquid-crystalline layer may be a temporary support that is peeled off after the formation of the cholesteric liquid-crystalline layer. After the formation of a cholesteric liquid-crystalline layer, the cholesteric liquid-crystalline layer may be transferred to a base material.

Glass or the like, as well as plastic films, may be used as the temporary support.

<Optical Member>

The optical member includes the above-described reflection film and an information presentation layer including the pattern. In reading the pattern, light irradiation may be performed from the information presentation layer side of the optical member and light reflecting the optical information derived from the pattern may be reflected from the reflection film and detected.

[Information Presentation Layer]

The information presentation layer has a pattern of a material that absorbs or reflects light of the above-described reflection wavelength. Namely, the information presentation layer has a pattern of a material that absorbs or reflects infrared rays. The pattern may exist in the whole or in a part of the information presentation layer. The material that absorbs or reflects light of the reflection wavelength may be applied or printed by, for example, an ink jet method or the like onto the surface of the reflection film to thereby form a pattern. Alternatively, for example, after being applied uniformly onto the surface of a base material, the material may be subjected to printing evaporation in a unit of 0.5 to 3000 µm by using an infrared ray laser or the like to thereby form a pattern. For example, the description in Japanese Patent Laid-Open Publication No. 2011-152652 can be referred to regarding the latter method.

The pattern may be a pattern that can give the positional or coordinate information of the selected part of a region in the information presentation layer, when a part of a region is selected. The part to be selected may be a unit that can be photographed using, for example, a pen type imaging element having a light source that emits infrared rays and a sensor that detects infrared rays. Examples of the patterns include the dot pattern explained in paragraphs 0123-0152 of Japanese Patent Laid-Open Publication No. 2014-98943, and the like.

(Material that Absorbs or Reflects Infrared Rays)

As to the material that absorbs or reflects infrared rays, for example, a carbon ink, inks containing an inorganic ion (metal such as copper, iron or ytterbium), organic dyes such as phthalocyanine dye, dithiol compound dye, squarylium dye, croconium dye and nickel complex dye, and in addition, known infrared absorbing dyes, and known infrared reflective particles can be used. The material that absorbs or reflects infrared rays preferably does not have reflection or absorption in the visible light wavelength region.

[Layer Structure of Optical Member]

Examples of the layer configurations of the optical member when the reflection film includes a transparent layer include a configuration in which the information presentation layer, the transparent layer and the circularly-polarized light reflection layer are arranged in this order, and a configuration in which the information presentation layer, the circularly-polarized light reflection layer and the transparent layer are arranged in this order. Examples of the layer configurations of the optical member when the reflection film includes the base material and the transparent layer includes a configuration in which the information presentation layer, the base material, the transparent layer and the circularly-polarized light reflection layer are arranged in this order, and a configuration in which the base material, the transparent layer, the circularly-polarized light reflection layer and the information presentation layer are arranged in this order. In a configuration including two or more circularly-polarized light reflection layers, a configuration, in which all the circularly-polarized light reflection layers are adjacent to each other, and any of the information presentation layer, the base material and the transparent layer is not included between circularly-polarized light reflection layers, is preferable.

[Adhesion Layer]

The optical member or the reflection film may include an adhesion layer for adhesion of layers. The adhesion layer may be one formed from an adhesive.

As to the adhesives, from the viewpoint of a curing system, there are adhesives of a hot melt type, a heat curable type, a photo curable type, a reaction curable type and a pressure-sensitive adhesion type that does not require curing, and a compound such as acrylate-based, urethane-based, urethane-acrylate-based, epoxy-based, epoxy-acrylate-based, polyolefine-based, modified-olefine-based, polypropylene-based, ethylene-vinyl alcohol-based, vinyl chloride-based, chloroprene rubber-based, cyano acrylate-based, polyamide-based, polyimide-based, polystyrene-based or polyvinyl butyral-based compound can be used, respectively, as a material. From the viewpoint of workability and productivity, the photo curing type is preferable as the curing system, and from the viewpoint of optical transparency and heat resistance, an acrylate-based, a urethane-acrylate-based, an epoxy-acrylate-based raw material or the like is preferably used as a material.

[Applications of Optical Member: Handwriting Input System]

The applications of the optical member are not particularly limited. For example, the optical member can be utilized as a handwriting input sheet used in hand writing input systems using a reading device such as an optical pen. Handwritten information can be digitized and inputted to an information processor, through the utilization of the position or coordinate information according to the pattern in the information presentation layer of the optical member.

Japanese Patent Laid-Open Publication Nos. 2014-67398, 2014-98943, 2008-165385, 2008-108236 paragraphs [0021]-[0032], 2008-077451, and the like can be referred to regarding hand writing input systems.

Furthermore, the description in Japanese Patent No. 4725417 paragraphs [0024]-[0031] can be referred to regarding a preferable aspect in which the optical member is used while being stuck onto the surface of a display such as a television.

The optical member is used by adjusting the composition of the cholesteric liquid-crystalline layer such that the wavelength that exhibits reflection satisfying the above-described optical properties coincides with the wavelength of infrared rays emitted from a reading device or the like. Specifically, the helical pitch of the cholesteric liquid-crystalline phase may be adjusted by the above-described method. More preferably, the central wavelength of reflection coincides with the wavelength of infrared rays emitted from a reading device or the like.

(Reading Device, Light Source, Imaging Element)

The reading device to be used in a hand writing input system preferably includes a light source and an imaging element. The reading device may further include a processer for processing a taken image, a light control part for adjusting light irradiation, and the like. The reading device is preferably of, for example, a pen type, and is preferably made into a form usable as a pen-type scanner (optical pen). For example, Japanese Patent Laid-Open Publication Nos. 2014-98943 (particularly FIGS. 69(a)) and 2014-67398 (particularly FIG. 2) can be referred to regarding a specific configuration.

A light source capable of emitting light in an infrared wavelength region, with which the reflection film exhibits reflection that satisfies the above-described optical properties may be used as the light source. The light source may be one capable of emitting light in the infrared wavelength region, or may be one having been adjusted using a wavelength conversion member so as to be capable of radiating light in the infrared wavelength region. Any of a halogen lamp, a tungsten lamp, an LED, an LD, a xenon lamp, a metal halide lamp and the like can be used as the light source, and from the viewpoint of small size, light emission directivity, monochromatic ray and pulse modulation suitability, an LED or an LD is preferable.

The imaging element may include an infrared ray sensor. The light from the optical member, which reflects light information derived from a pattern may be detected by the infrared ray sensor, and furthermore, a part of the readout pattern may have been imaged. An infrared ray sensor capable of detecting light in the infrared wavelength region in which the reflection film shows reflection satisfying the above-described optical properties may be used as the infrared ray sensor.

Examples of the infrared ray sensors include photodiode type sensors using a semiconductor such as Si, Ge, HgCdTe, PtSi, InSb, PbS or the like, detectors obtained by linearly arranging photo detecting elements, and a CCD (Charge Coupled Device) and a CMOS (Complementary Metal-Oxide Semiconductor) which are capable of capturing an image.

The imaging element may further include a lens for enlarging an obtained image, a filter for shielding light other than the light from the optical member, a filter for preventing light other than light in the infrared wavelength region from entering the infrared ray sensor, or the like.

(Utilization of Circularly-Polarized Light)

When the reflection film includes only either one of the right circularly-polarized light reflection layer and the left circularly-polarized light reflection layer, and the optical member selectively reflects either one of right circularly-polarized light and left circularly-polarized light, circularly-polarized light can be utilized in the hand writing input system. Namely, the optical member may be irradiated selectively with circularly-polarized light of the sense that is selectively reflected by the reflection layer. Furthermore, circularly-polarized light of the sense that is selectively reflected by the reflection layer of the optical member may be selectively detected. By using either method, a detection error can be decreased by enhancement of an S/N value of detection. Namely, imaging with a small influence of outside light and reflected light from the surface of the optical member can be performed. Preferably, the optical member is selectively irradiated with circularly-polarized light of the sense that is selectively reflected by the reflection film and circularly-polarized light of the sense that is selectively reflected by the reflection film is selectively detected.

For the irradiation with circularly-polarized light, a circular polarization plate including a linear polarizer, a λ/4 retardation layer or a cholesteric liquid-crystalline layer may be used in combination with a light source and be applied for light irradiation of the optical member. For example, a light source of non-polarized light such as an LED may be used in combination with a linear polarizer and a λ/4 retardation layer to thereby give circularly-polarized light, emitted light from a light source of non-polarized light such as an LED may be used in combination with a circular polarization plate to thereby give circularly-polarized light, or a light source of polarized light such as an LD may be used in combination with a λ/4 retardation layer to thereby give circularly-polarized light.

For detecting circularly-polarized light, the imaging element may include a linear polarizer, or may include a linear polarizer and a λ/4 wavelength layer so that an infrared ray sensor, the linear polarizer and the λ/4 wavelength layer are positioned in this order. Namely, the infrared ray sensor may be constituted so as to detect linearly polarized light. When the imaging element includes only a linear polarizer, a configuration may be such that light entering the linear polarizer goes through the λ/4 wavelength layer. The direction of transmission axis of the linear polarizer and the direction of optical axis of the λ/4 wavelength layer are preferably adjusted such that the circularly-polarized light only from the reflection layer of the optical member is detected.

In order to perform selective irradiation with circularly-polarized light and detect the circularly-polarized light, a reading device may include a linear polarizer. The linear polarizer may be provided on the irradiation side viewed from the light source, and on the light entering side viewed from the infrared ray sensor.

The reading device may include a linear polarizer and a λ/4 wavelength layer. When the linear polarizer and the λ/4 wavelength layer are included, they may be provided such that the light source, the linear polarizer and the λ/4 wavelength layer are positioned in this order, and simultaneously, the sensor, the linear polarizer and the λ/4 wavelength layer are positioned in this order. By providing the linear polarizer, or the linear polarizer and the λ/4 wavelength layer in a reading device in which a light source and an imaging element are united, alignment that is required for detecting circularly-polarized light from the reflection layer of the optical member becomes unnecessary.

The reading device may include the linear polarizer, and separately, the λ/4 retardation layer may be arranged between the optical member of the present invention and the reading device, or the optical member of the present invention may include the λ/4 retardation layer.

A linear polarizer that has a function of converting non-polarized light in the infrared wavelength region into linearly polarized light may be used as the linear polarizer. The linear polarizer includes a reflection-type linear polarizer and an absorption-type linear polarizer.

Examples of the reflection type linear polarizers include (i) a linearly polarized light reflection plate having a multilayer structure, (ii) a polarizer obtained by laminating thin films having different birefringence, (iii) a wire grid-type polarizer, (iv) a polarizing prism, (v) a polarizing plate of scattering anisotropy type, and the like.

Examples of the absorption-type linear polarizers include (i) a polarizer obtained by aligning and fixing metal nano particles having shape anisotropy, (ii) a polarizer obtained by aligning and fixing dichroic dyes, and the like.

The front retardation of the λ/4 wavelength layer may be a length of ¼ the infrared wavelength region, or "central wavelength*n±¼ of the central wavelength (n is an integer)." In particular, the front retardation may be the reflection wavelength of the reflection film, a length of ¼ the central wavelength of the emission wavelength of the light source, or the like. For example, when the emission central wavelength of the light source is 1000 nm, the retardation is preferably 250 nm, 750 nm, 1250 nm, 1750 nm or the like. Furthermore, smaller dependency of the retardation on a light incident angle is more preferable, and in this regard, a retardation film having retardation of a length of ¼ the central wavelength is most preferable.

Note that front retardation can be measured by causing light of a wavelength in the infrared wavelength region to enter KOBRA 21ADH or WR (manufactured by Oji Scientific Instruments) in the normal direction of the film. In selecting the measurement wavelength, the measurement can be performed by manually changing a filter for the wavelength selection, or by converting the measurement value through the use of a program or the like.

The λ/4 wavelength layer is not particularly limited, and can be appropriately selected in accordance with a purpose. Examples of the λ/4 wavelength layer include a stretched polycarbonate film, a stretched norbornene-based polymer film, a transparent film containing aligned birefringent inorganic particles such as strontium carbonate, a thin film obtained by obliquely depositing an inorganic dielectric substance on a support, and the like. Furthermore, examples of the λ/4 wavelength layers include (1) retardation films obtained by laminating a birefringent film having large retardation and a birefringent film having small retardation such that optical axes thereof orthogonally intersect with each other as described in Japanese Patent Laid-Open Publications Nos. 05-27118 and 5-27119, (2) a retardation film obtained by laminating a polymer film that can function as λ/4 wavelength layer at a specified wavelength and a polymer film that is made of the same material as that of the former film and can function as a λ/2 wavelength layer at the same wavelength to thereby give a layer that can function as a λ/4 wavelength layer in a wide wavelength region as described in Japanese Patent Laid-Open Publication No. 10-68816, (3) a retardation film that can function as a λ/4 wavelength layer in a wide wavelength region by laminating two polymer films as described in Japanese Patent Laid-Open Publication No. 10-90521, (4) a retardation film that uses a modified polycarbonate film and can function as a λ/4 wavelength layer in a wide wavelength region as described in International Publication No. 00/26705 pamphlet, (5) a retardation film that uses a cellulose acetate film and can function as a λ/4 wavelength layer in a wide wavelength region as described in International Publication No. 00/65384 pamphlet, and the like.

A commercially available product can be used as the λ/4 wavelength layer, and examples include Pure-Ace WR (manufactured by Teijin Limited), and the like.

The thickness of the λ/4 wavelength layer is preferably 0.2 μm to 300 μm, more preferably 0.5 μm to 150 μm, further more preferably 1 μm to 80 μm.

The λ/4 wavelength layer may be used by being arranged such that the optical axis of the λ/4 wavelength layer becomes 45 degrees relative to the transmission axis of a linear polarizer.

As described above, the λ/4 wavelength layer may be included in the optical member. When the optical member includes the λ/4 wavelength layer, the layer may be included on the outermost face on the information presentation layer side relative to the circularly-polarized light reflection layer.

EXAMPLES

Hereinafter, the present invention will be explained more specifically by giving Examples. Materials, reagents, substance amounts and ratios thereof, operations and the like shown in the following Examples can be appropriately modified as long as they do not deviate from the purport of the present invention. Accordingly, the scope of the present invention in not limited to the following Examples.

[Production of Reflection Film 1]

An application liquid B shown in Table 1 was applied onto one surface of a PET film (COSMOSHINE A-4300 manufactured by Toyobo Co., Ltd.; thickness 75 μm) by using a wire bar at room temperature, so as to give a layer of 8 μm thickness after drying. After drying the applied layer for 30 seconds at room temperature, the applied layer was heated in an atmosphere of 85° C. for 2 minutes, and after that, was UV-irradiated with a D bulb (lamp 90 mW/cm) manufactured by Fusion with an output of 60% at 30° C. for 6 to 12 seconds to thereby give an acrylic layer. Without conducting a rubbing treatment of the obtained acrylic layer, an application liquid A-1 shown in Table 1 was applied onto the obtained acrylic layer at room temperature, so as to give a layer of 5 μm thickness after drying. The obtained application film was dried, heated and UV-irradiated in the same manner as the above to thereby give a liquid crystalline layer. An application liquid A-5 shown in Table 1 was applied onto the obtained liquid crystalline layer at room temperature, so as to give a layer of 5 μm thickness after drying, which was then subjected to drying, heating and UV-irradiation in the same manner as the above to form a second liquid crystalline layer and to thereby give a reflection film 1.

[Production of Reflection Film 2]

An application liquid B shown in Table 2 was applied onto one surface of a PET film (COSMOSHINE A-4300 manufactured by Toyobo Co., Ltd.; thickness 75 μm) by using a wire bar at room temperature, so as to give a layer of 8 μm thickness after drying. After drying the applied layer for 30 seconds at room temperature, the applied layer was heated in an atmosphere of 85° C. for 2 minutes, and after that, was UV-irradiated with a D bulb (lamp 90 mW/cm) manufactured by Fusion with an output of 60% at 30° C. for 6 to 12 seconds to thereby give an acrylic layer. Without conducting a rubbing treatment of the obtained acrylic layer, an application liquid A-1 shown in Table 1 was applied onto the obtained acrylic layer at room temperature, so as to give a layer of 5 μm thickness after drying. The obtained application film was dried, heated and UV-irradiated in the same manner as the above to thereby produce a liquid crystalline layer and give a reflection film 2.

TABLE 1

| Material (Type) | Material name (manufacturer) | parts by mass |
|---|---|---|
| Application liquid (A-1) | | |
| Liquid crystal compound | Compound 1 | 10 |
| Polymerization initiator | Irg-819 (BASF) | 4 |
| Horizontal alignment agent | Compound 2 | 0.03 |
| Chiral agent | LC-756 (BASF) | 3.5 |
| Solvent | 2-butanone (Wako Pure Chemical Industries, Ltd.) | Adjusted according to layer thickness |
| Application liquid (A-5) | | |
| Liquid crystal compound | Compound 1 | 100 |
| Polymerization initiator | Irg-819 (BASF) | 4 |
| Horizontal alignment agent | Compound 2 | 0.03 |
| Chiral agent | Compound 3 | 5.5 |
| Solvent | 2-butanone (Wako Pure Chemical Industries, Ltd.) | Adjusted according to layer thickness |
| Application liquid (B) | | |
| Acrylic monomer | Viscoat 360 (Osaka Organic Chemical Industry Ltd.) | 100 |
| Polymerization initiator | Irg-819 (BASF) | 4 |
| Surfactant | Compound 2 | 0.03 |
| Solvent | 2-butanone (Wako Pure Chemical Industries, Ltd.) | Adjusted according to layer thickness |

Compound 1

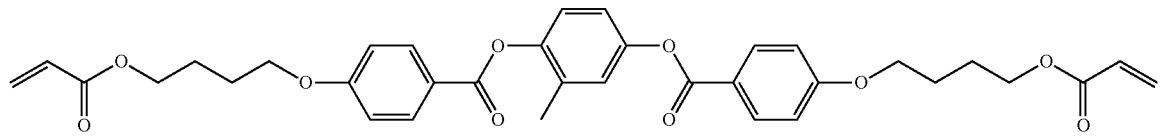

Compound 2

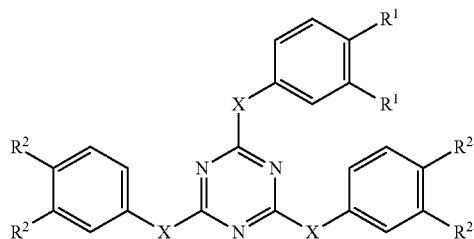

compound described in Japanese Patent Laid-Open Publication No. 2005-99248

| R¹ | R² | X |
|---|---|---|
| O(CH$_2$)$_2$O(CH$_2$)$_2$(CF$_2$)$_6$F | O(CH$_2$)$_2$O(CH$_2$)$_2$(CF$_2$)$_6$F | NH |

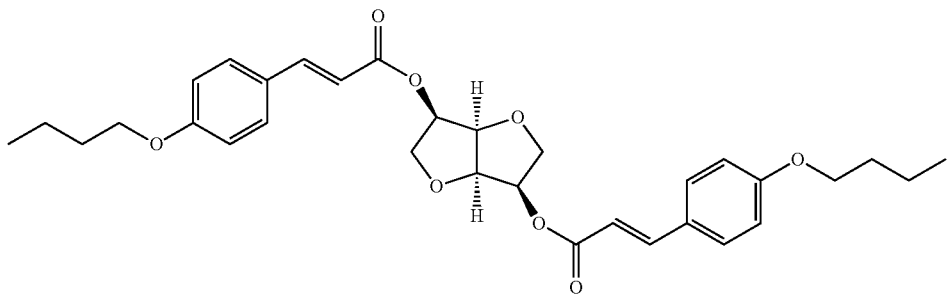

Compound 3

Evaluation Method of Film

Figure 1B:
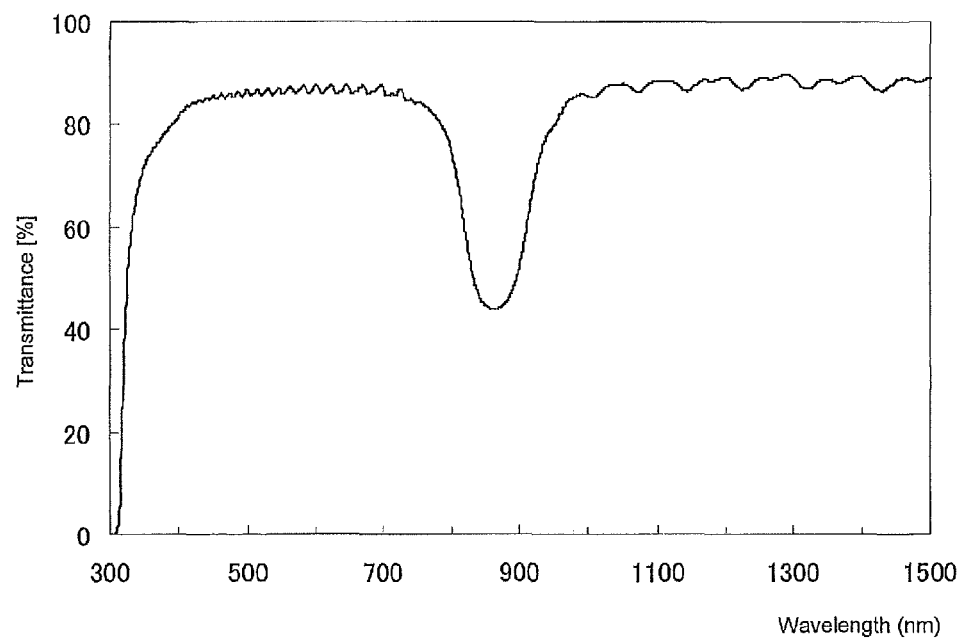

Transmission spectra of the produced reflection films 1 and 2 were measured using a spectrophotometer V-670 manufactured by JASCO. The obtained transmission spectra are shown in FIG. 1. In the reflection film 1, a reduction in the transmittance was observed, exhibiting reflection having a central wavelength of 850 nm and a half-value width of 115 nm. In the reflection film 2, a reduction in the transmittance was observed, exhibiting reflection having the central wavelength of 850 nm and the half-value width of 117 nm.

Respective physical values of the reflection film were obtained using a spectrophotometer V-670 manufactured by JASCO. The specular reflectance was measured in combination with an absolute reflectance measurement unit model ARV474S, and the total angle measurement value of reflection (total reflectance) was measured in combination with an integrating sphere unit model ISN723. The specular reflectance is a measurement value at an incident angle of 5°. The diffuse reflectance was calculated by subtracting the specular reflectance from the total angle measurement value. The specular reflectance and the total reflectance were measured using light having a wavelength of 850 nm.

The direct transmittance was a measurement value at an incident angle of 0°, and the direct transmittance of non-polarized light at a wavelength of 380 to 780 nm was calculated by averaging the measured transmittance of 380 to 780 nm.

The haze value was measured using a haze meter NDH-2000 manufactured by NIPPON DENSHOKU INDUSTRIES, Co., LTD.

Results were as follows.
(Reflection Film 1)
Specular reflectance (850 nm): 14.7%
Diffuse reflectance (850 nm): 64.2%
Direct transmittance of non-polarized light of 380 to 780 nm in wavelength: 83.5%
Haze value: 3.2%
(Reflection Film 2)
Specular reflectance (850 nm): 11.0%
Diffuse reflectance (850 nm): 35.6%
Direct transmittance of non-polarized light of 380 to 780 nm in wavelength: 85.5%
Haze value: 2.2%

Formation of information presentation layer

Carbon ink was applied onto each non-applied side of the PET film of the reflection film 1 and the reflection film 2. The surface to which the carbon ink was applied was irradiated with infrared light having a beam diameter 10 μm of a YVO$_4$ laser (wavelength of 1064 nm) and a previously designed dot pattern was formed by printing evaporation. Specifically, carbon ink was removed according to the designed dot pattern and the information presentation layer was formed to thereby give the optical members 1 and 2.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

11: outermost surface of cholesteric liquid-crystalline layer
101: inclination of helix axis on outermost surface

The invention claimed is:
1. A reflection film, comprising:
a right circularly-polarized light reflection layer that selectively reflects right circularly-polarized light and a left circularly-polarized light reflection layer that selectively reflects left circularly-polarized light as circularly-polarized light reflection layers,
each of the circularly-polarized light reflection layers consisting of a layer obtained by fixing a cholesteric liquid-crystalline phase,
the reflection film having a reflection wavelength at which a diffuse reflectance for non-polarized light becomes 50% or more in a wavelength region in which each of the circularly-polarized light reflection layers exhibits selective reflection,
the reflection wavelength being in an infrared wavelength region, and the reflection film exhibiting a direct transmittance of non-polarized visible light of 50% or more and a haze value of 5% or less; and a transparent layer, wherein the transparent layer is directly in contact with at least one layer of the circularly-polarized light reflection layers, wherein the transparent layer is a layer obtained by applying and curing a non-liquid crystalline composition containing a (meth)acrylate monomer.

2. The reflection film according to claim 1, wherein a specular reflectance for non-polarized light is 20% or less at the reflection wavelength.

3. The reflection film according to claim 1, wherein each of the circularly-polarized light reflection layers is a layer formed from a liquid crystal composition containing a polymerizable liquid crystal compound, a chiral agent and a horizontal alignment agent.

4. The reflection film according to claim 3, wherein in-plane alignment azimuths of liquid crystal molecules on the outermost surface of the circularly-polarized light reflection layer are random.

5. The reflection film according to claim 1, having inclination of helix axes of a cholesteric liquid-crystalline phase on at least one of outermost surfaces of at least one layer of the circularly-polarized light reflection layers, wherein the inclination of helix axes changes respectively in the plane, and the maximum value of the inclination of a helix axis is 20° or less.

6. The reflection film according to claim 1, wherein each of the circularly-polarized light reflection layers is a layer formed from a liquid crystal composition containing a polymerizable liquid crystal compound, a chiral agent and a horizontal alignment agent, and one layer of the circularly-polarized light reflection layers is formed from the liquid crystal composition directly applied onto a surface of the transparent layer.

7. The reflection film according to claim 6, wherein the other layer of the circularly-polarized light reflection layers is formed from the liquid crystal composition directly applied onto the layer directly in contact with the transparent layer.

8. The reflection film according to claim 1, comprising a base material, and comprising the base material, the transparent layer and the circularly-polarized light reflection layers in this order.

9. The reflection film according to claim 8, consisting essentially of the base material, the transparent layer and the circularly-polarized light reflection layers.

10. An optical member comprising the reflection film according to claim 9 and an information presentation layer, wherein the information presentation layer has a pattern of a material that absorbs or reflects light of the reflection wavelength.

11. An optical member according to claim 10, consisting essentially of the reflection film and the information presentation layer.

12. An optical member comprising the reflection film according to claim 1 and an information presentation layer, wherein the information presentation layer has a pattern of a material that absorbs or reflects light of the reflection wavelength.

13. The optical member according to claim 12, comprising the circularly-polarized light reflection layer, the transparent layer and the information presentation layer in this order.

14. The optical member according to claim 12, comprising the transparent layer, the circularly-polarized light reflection layer and the information presentation layer in this order.

15. The optical member according to claim 12, wherein the pattern is a dot pattern.

16. The optical member according to claim 12, wherein the pattern is provided by printing.

17. The optical member according to claim 16, wherein the reflection film comprises a base material, and the pattern is provided by printing on a surface of the base material.

18. A display comprising the optical member according to claim 12.

19. The reflection film according to claim 1, comprising the transparent layer, one layer of the circularly-polarized light reflection layers, and the other layer of the circularly-polarized light reflection layers, in this order, wherein each adjacent layer of the transparent layer and the circularly-polarized light reflection layers are directly in contact.

* * * * *